United States Patent [19]

Rossi

[11] Patent Number: 5,199,156
[45] Date of Patent: Apr. 6, 1993

[54] METHOD FOR ASSEMBLING A VEHICLE USING AN AUTOMATIC TOY TAB SYSTEM

[76] Inventor: Christiano G. Rossi, 6980 Sandalwood, Birmingham, Mich. 48010

[21] Appl. No.: 764,284

[22] Filed: Sep. 23, 1991

Related U.S. Application Data

[62] Division of Ser. No. 599,764, Oct. 9, 1990, abandoned.

[51] Int. Cl.⁵ .................. B21D 39/00; B23D 11/00
[52] U.S. Cl. ............................. 29/509; 29/513; 29/786; 29/788
[58] Field of Search ............. 29/469, 509, 510, 511, 29/512, 513, 771, 786, 787, 788, 429, 430, 431

[56] References Cited

U.S. PATENT DOCUMENTS

| | | | |
|---|---|---|---|
| 4,627,158 | 12/1986 | Mitoh | 29/771 |
| 4,757,607 | 7/1988 | Sciaky et al. | 29/771 |
| 4,776,084 | 10/1988 | Naruse et al. | 29/771 |
| 5,040,290 | 8/1991 | Usui et al. | 29/771 |
| 5,044,541 | 9/1991 | Sekine et al. | 29/771 |

Primary Examiner—Timothy V. Eley
Attorney, Agent, or Firm—Edward A. Craig

[57] ABSTRACT

A method and apparatus for toy tabbing a vehicle body is provided. This method includes a carrier means for transporting a vehicle body into a single work station and a delivery means for delivering side aperture panels to the work station. Vehicle body parts are supplied within the work station by an electrically indexed parts magazine. A programmable robotic means is provided for loading and assembling the side aperture panels and the vehicle body components to the vehicle underbody. A positioning unit is also provided to support the side aperture panels adjacent to the underbody to allow the programmable robotic means to assemble the vehicle's main body framework.

6 Claims, 5 Drawing Sheets

METHOD FOR ASSEMBLING A VEHICLE USING AN AUTOMATIC TOY TAB SYSTEM

This is a division of U.S. patent application Ser. No. 07/599,764 filed Oct. 9, 1990, now abandoned.

BACKGROUND OF THE INVENTION

1. Field of the Invention

The present invention relates to a vehicle body assembly line system and, more particularly, to an automatic toy tab system capable of assembling the main body framework of a vehicle in a single work station.

2. Description of Related Art

The assembly of vehicle bodies in today's modern assembly plants generally requires that various operations be performed in a succession of work stations. One such operation is the assembly of the main body framework, which is formed by attaching side aperture panels to the vehicle's underbody and roof headers and roof bows to the upper portion of the side aperture panels. In the past, this operation was usually performed by welding the body components together, either manually or by an automated means. In order to reduce the cost of assembling the vehicles, a method of assembly referred to as "toy tabbing" has been developed to replace welding. Toy tabbing is an assembly procedure where the vehicle body components have tab portions which are designed to be bent and crimped about corresponding vehicle body components, such as the underbody, to form a bond thereon.

In the past, these toy tab systems would generally require a large hanger to locate the side aperture panels in a predetermined position alongside the underbody, a second fixture to locate the roof headers and bows, and a third fixture to bend and crimp the vehicle body components in the predetermined position, thus requiring the work station to have enough area to accommodate the different locating and bending fixtures. In order to reduce the area requirements of these stations, the toy tabbing of the vehicle main body framework was performed in a number of stations along the assembly line. It is easy to understand that the more area required in each work station, the increased number of assembly stations and the increased number of assembly fixtures in each station increases the cost of production.

Additionally, most of these toy tab systems are not fully automated, thus requiring some manual operation. This results in low worker efficiency. Another problem associated with most assembly stations is that the stations require large stationary fixtures in order to locate the vehicle body components. Hence, when the body style is changed the work station must be re-tooled. The above mentioned problems make it difficult to achieve the deisred productivity level required by today's manufacturers.

SUMMARY OF THE INVENTION

In order to solve these problems, the invention provides a fully automated toy tab assembly system which assembles the main body framework of a vehicle within a single work station. The system includes a carrier means for transporting a vehicle underbody into the work station for assembly and out of the station after assembly. Side aperture panels are delivered over the work station by an aperture float and delivery means and lowered into the work station by an elevator system. The work station is also provided with at least one magazine which supplies the station with roof headers and roof bows. In order to fully automate the system, two programmable robots are provided on either side of the main carrier means and positioned so that they may remove the side aperture panels from the elevator system and place the panels alongside the vehicle underbody. A positioning means is provided to support the side aperture panels adjacent to the underbody so that the programmable robots may disengage from the side aperture panels and load and bend the roof headers and roof bows to the upper edges of the side aperture panels and secure the side aperture panels to the vehicle underbody.

BRIEF DESCRIPTION OF THE DRAWINGS

The various advantages of the present invention will become apparent to one skilled in the art by reading the following specification and subjoined claims and by referencing the following drawings in which:

DESCRIPTION OF THE PREFERRED EMBODIMENTS

Figure 1:
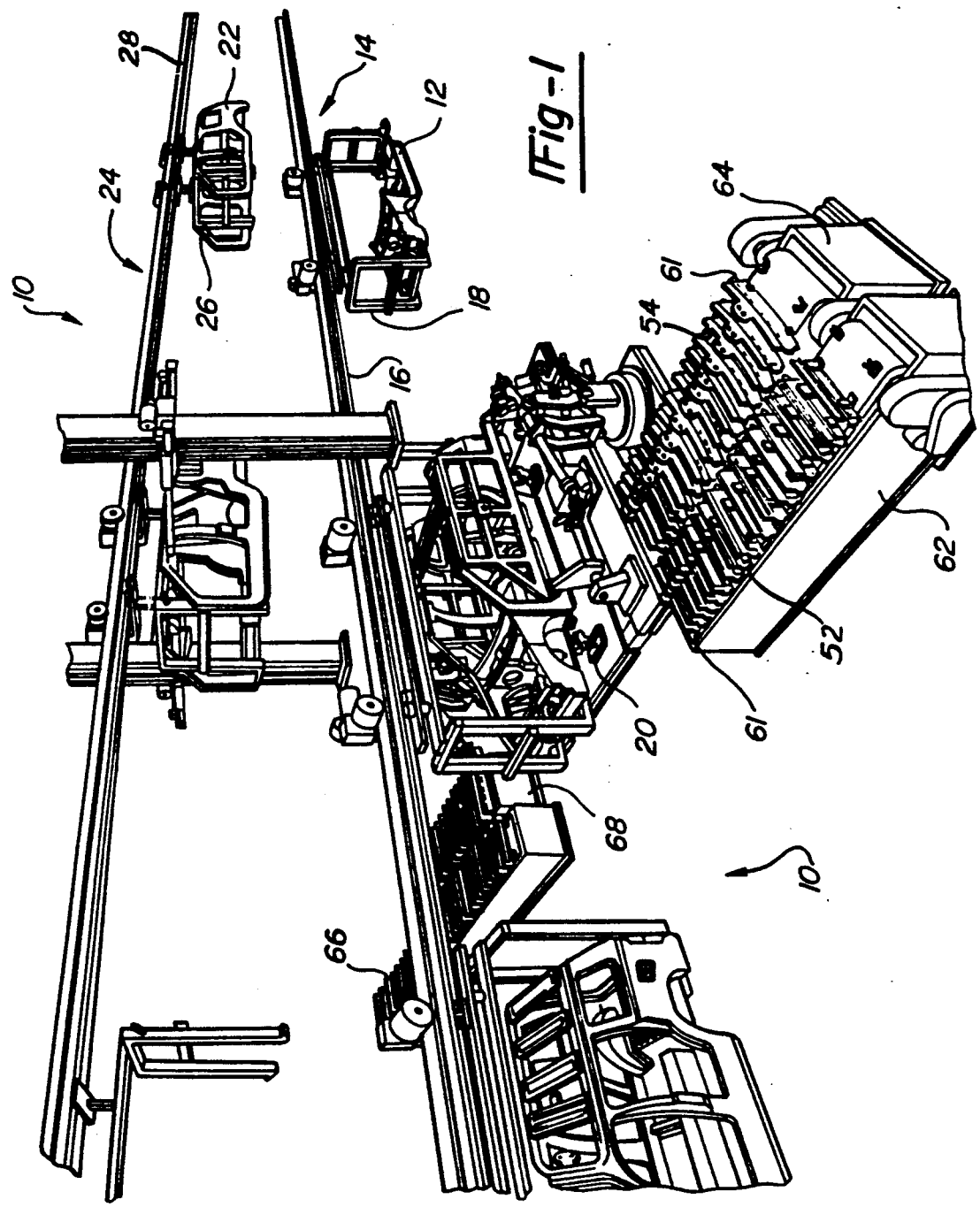
FIG. 1 is a perspective view of the single work station of the claimed invention.

Referring now to the drawings, FIG. 1 shows the automatic toy tab system of the invention. This automatic toy tab system, which is located within a single work station generally designated 10, is part of an automated assembly line system. In order to accommodate work content and volume requirements, two or more identical work stations 10 may be used within the assembly line system.

In accordance with the present invention, an underbody 12 is transferred into the station 10 by the main monotractor carrier system 14. The main monotractor carrier 14 includes an I-beam 16 which supports a carrier 18 which carries the underbody 12 from the underbody welding station (not shown) into the work station 10. This main monotractor carrier 14 is of a type commonly used in vehicle assembly lines and needs not to be discussed in further detail. It should be noted that the main monotractor carrier 14 divides the work station 10 into left and right sides. For the purpose of illustration, FIGS. 2-8 show the right side only.

Once in the station 10, the carrier 18 will be positioned in the proper X, Y and Z coordinates by lower locating units 20. It is essential that the carrier 18 be accurately located within the work station 10 in order to achieve the high quality product required by today's manufacturers. Accordingly, the lower locating units 20 are the subject of U.S. Pat. No. 4,951,931, entitled Adjustable Locating Block, the disclosure of which is hereby incorporated by reference.

Side aperture panels 22 are delivered directly over the work station by an aperture float and delivery monotractor system 24. It should be noted that the aperture float and delivery monotractor system 24 delivers two side aperture panels 22 for each underbody 12 delivered to the work station 10. The side aperture panels 22 are supported by a carrier means 26 which travels along an I-Beam 28 that carries side aperture panels 22 from the side aperture panel assembly station (not shown) to the station 10. The aperture float and delivery system 24 is of a type commonly used in assembly lines and thus needs not to be discussed in further detail.

Figure 2:
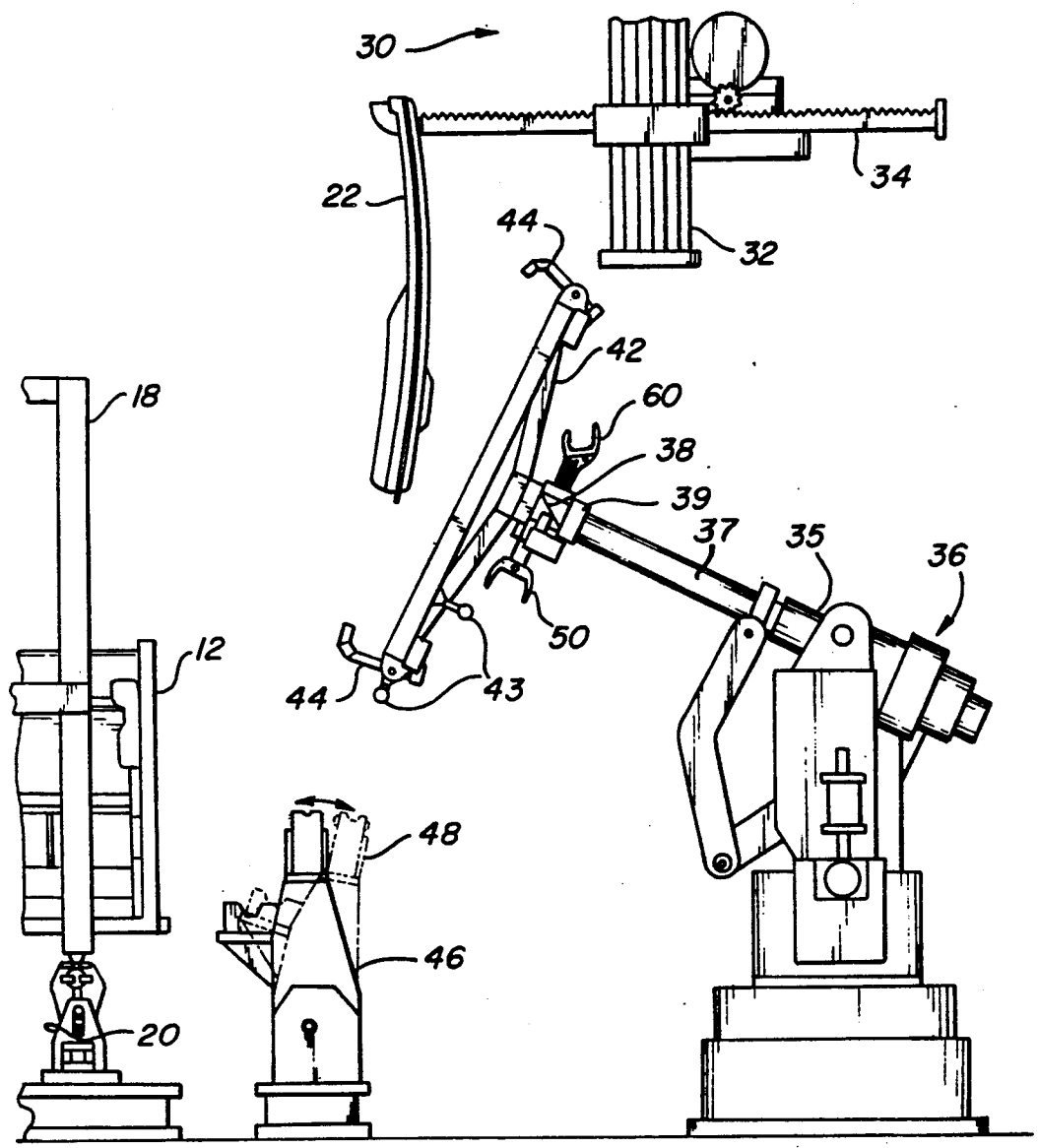
FIG. 2 is an elevational view of the work station showing one side of the automatic toy tab assembly.

The work station 10 provides an aperture unloading elevator system 30 adjacent to the side aperture panels 22, as best shown in FIG. 2. To unload the panels 22 from the carrier means 26, each elevator 30 will utilize a two axis rack and pinion electric servo drive system mounted on pillar members 32. Each elevator 30 has two rack members 34 which lift the side aperture panels 22 off the carrier means 26. Once the side aperture panels 22 have been removed from the carrier means 26, the elevator 30 lowers the panels 22 down the pillar member 32 to allow access to the work station 10. In the preferred embodiment, the aperture float and delivery monotractor system 24 returns the empty carrier means 26 to the side aperture panel assembly station (not shown).

In accordance with the present ention, the work station 10 has a pair of programmable robotic means centrally located on the floor at either side of the work station 10. The programmable robotic means can include any electronic or hydraulic robot which can be programmed to move through a full range of movement. This robot 36 has a member 37 to which a tool changer 38 is connected via a flexible wrist member 39 which allows the robot 36 to perform multiple functions within the work station 10, as discussed in detail below. The arm member 37 is connected to the body of the robot 36 by a telescoping trunnion member 35 to provide movement through the robots sixth axis.

In the preferred embodiment, the tool changer 38 will have the following three end effectors: the panel fixture 40, the gripper 50, and the bender 60. The end effector panel fixture 40 engages a frame member 42 which includes an upper and lower clamping means 44 controlled by the programmable robot 36 through the end effector panel fixture 40. The frame member 42 also includes knob members 43 designed to be received by the positioning means 46, as discussed in detail below.

Figure 3:
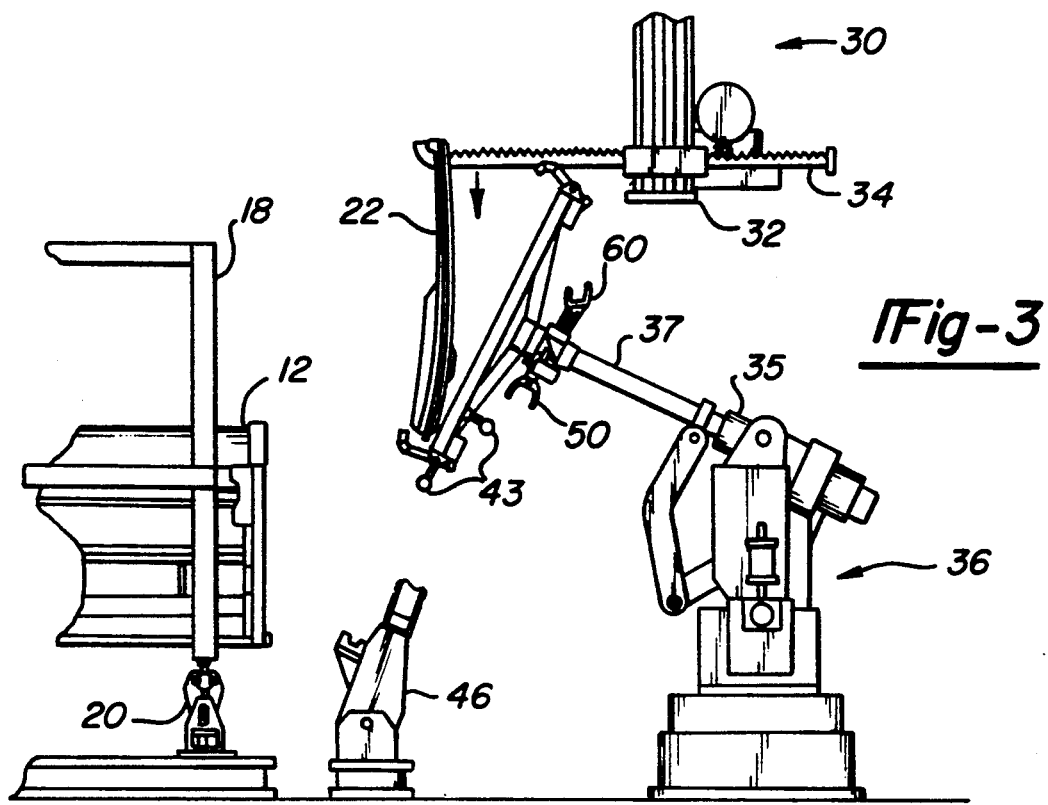
FIG. 3 is the elevational view of FIG. 2 showing the robot gripping the side aperture panel.
Figure 4:
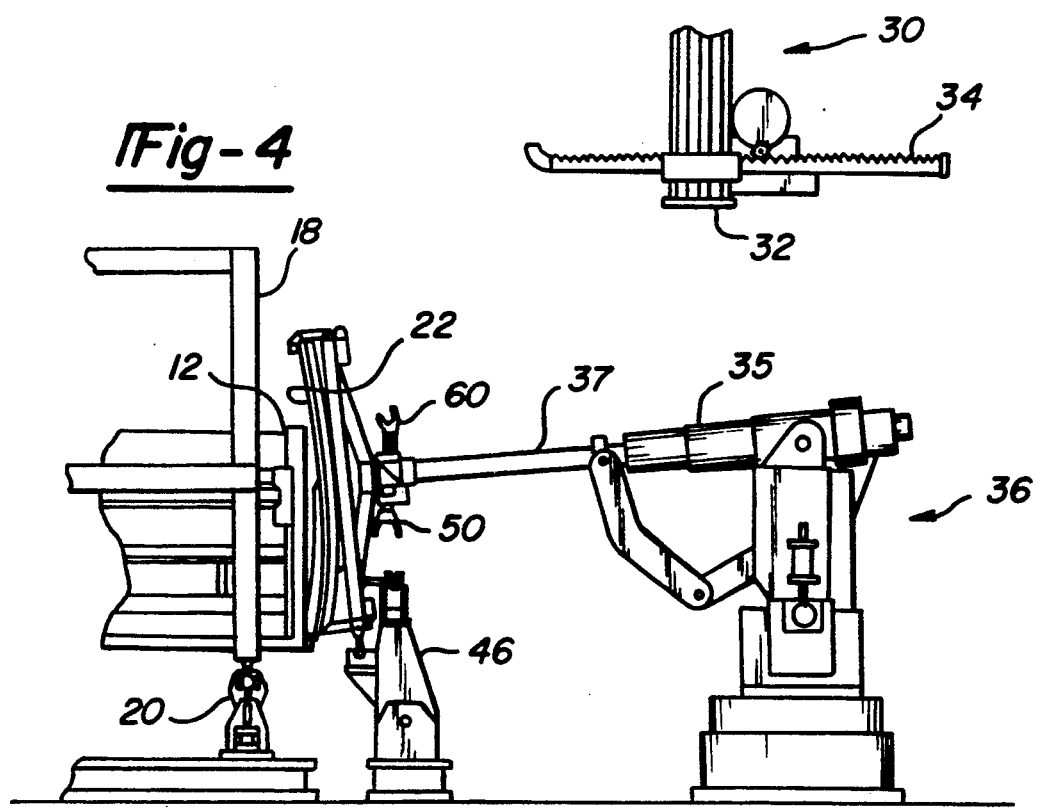
FIG. 4 is the elevational view of FIG. 2 showing the robot locating the side aperture panel in the body position.

Once the elevator system 30 has removed the side apertures panels 22 from the float and delivery monotractor system 24 and lowers the panels 22 into the work station 10, the robots 36 are programmed to unload the panels 22 from the elevator system 30 with the end effector panel fixture 40 and place the panel alongside the underbody 12 in the body framework position, as best shown in FIGS. 2-4. This is accomplished by swinging the arm member 37 upward until the lower clamp member 44 of the frame member 42 engages the lower end of the side aperture panel 22 and telescoping the arm member 37 forward via the trunnion member 35 until the side aperture panel 22 has cleared the rack members 34 of the elevator system 30. The clamp members 44 will then close about the side aperture panel 22 and lower it into the station 10.

Once the robot 36 has positioned the side aperture panel 22, a lower pivoting unit 46 clamps the frame member 42. The lower pivoting unit 46 is mounted on the work station floor and has clamping members 48 designed to clamp the knob members 43 on the frame member 42. This pivoting unit 46 allows the robot 36 to disengage from the frame member 42 and continue the body framework assembly, as discussed in detail below. It should be noted that the frame member 42, the pivoting unit 46, and the robot 36 are independent from the side aperture panels 22 so that if the design of the side aperture panels 22 are changed, the work station 10 will still be able to perform the intended assembly functions.

Figure 5:
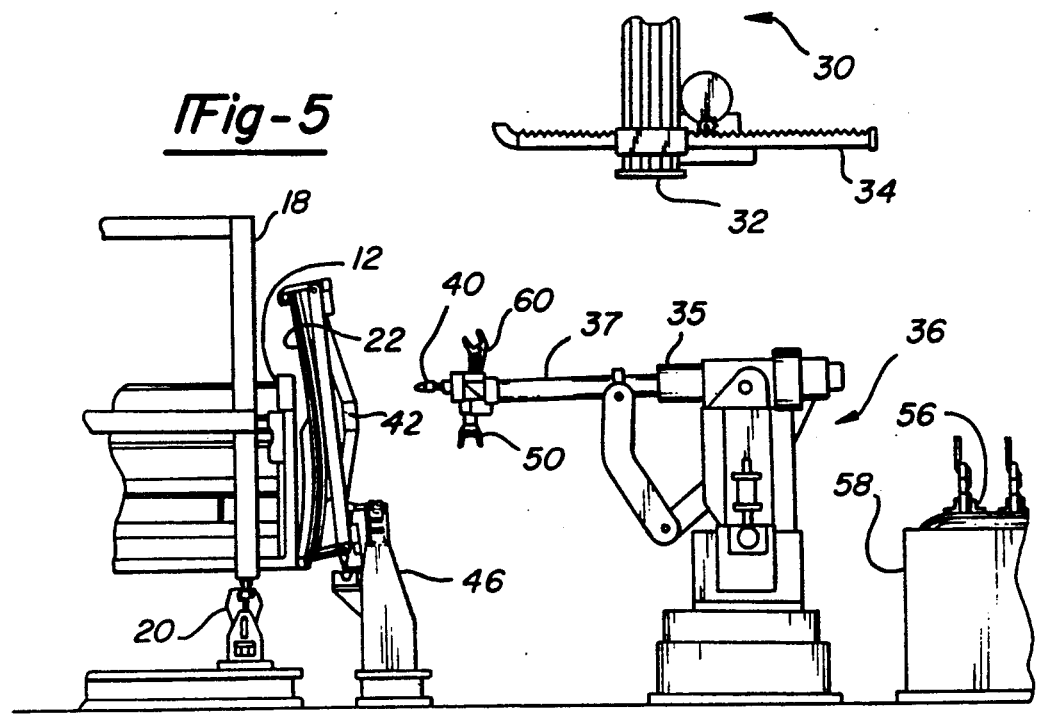
FIG. 5 is the elevational view of FIG. 2 showing the robot detached from the side aperture panel.
Figure 6:
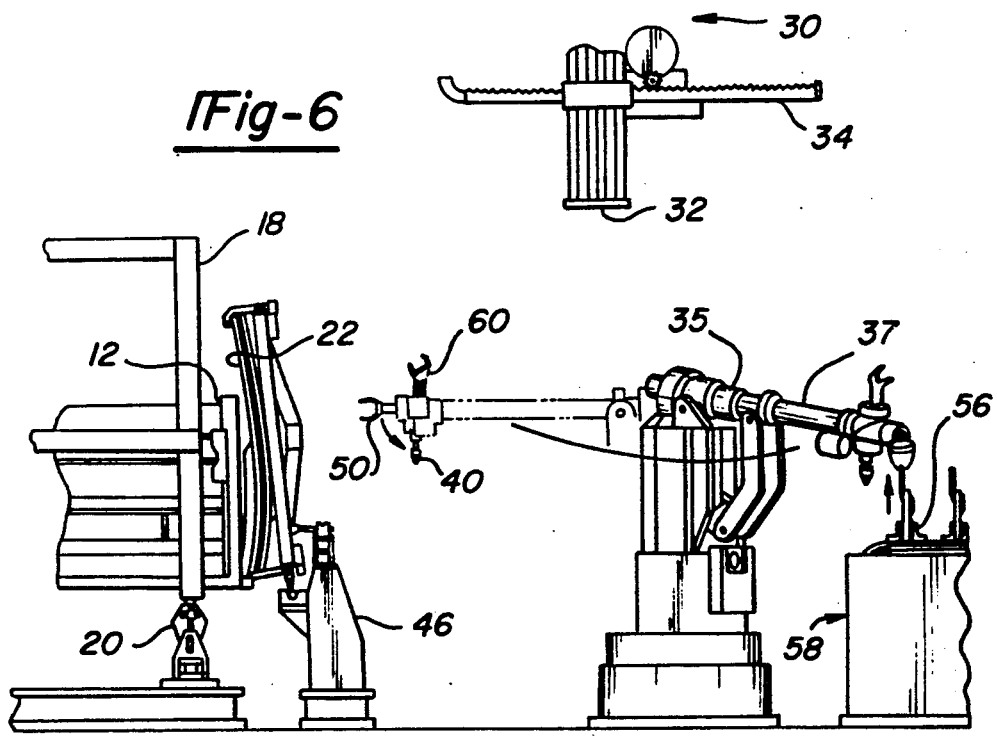
FIG. 6 is the elevational view of FIG. 2 showing the robot pivoting and gripping a body component.
Figure 7:
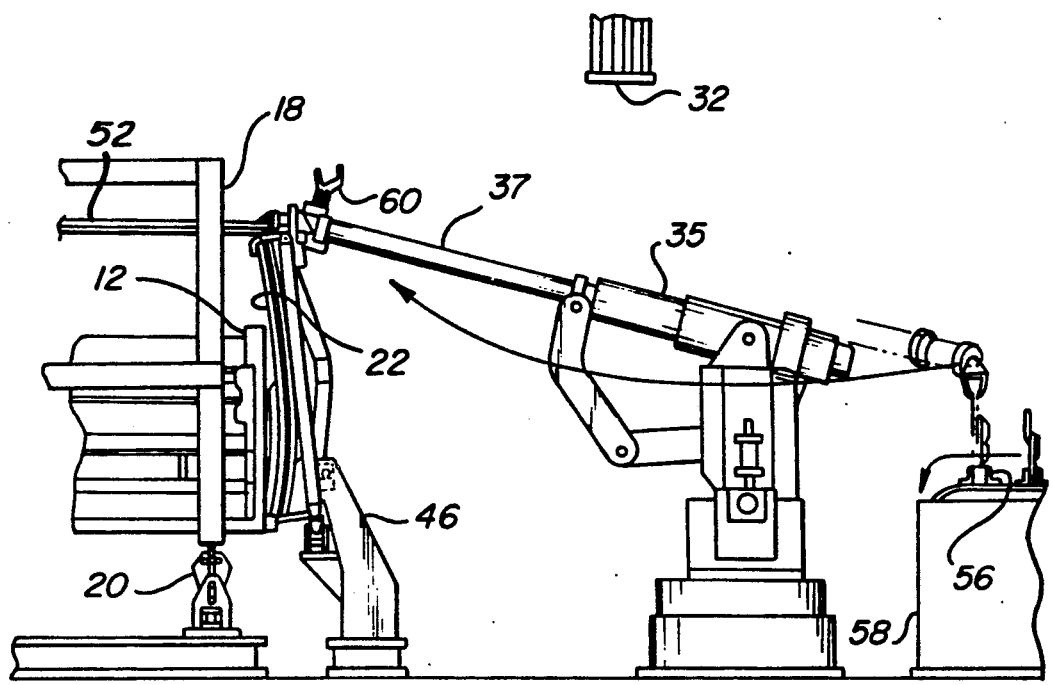
FIG. 7 is the elevational view of FIG. 2 showing the robot pivoting and locating a body component on the side aperture panel.

With the side aperture panel 22 in place, As shown in FIG. 5, the robots 36 will disengage from the frame member 42 and rotate the tool changer 38 via the flexible wrist 39 to position the end effector gripper 50. The end effector gripper 50 is designed to grip the vehicle body components, such as roof headers 52 and roof bows 54 so the robot may locate the components on the upper end of the side aperture panels 22, as shown in FIG. 6. In order to provide these parts to the work station 10, the work station 10 will contain four roof header 52 and roof bow 54 delivery magazines 58 that will be loaded manually by the production operator from stock containers (not shown). All magazines 58 are electrically index systems and include part location and orientation units 56 at the unload end for robot pick-up point reliability. In the preferred embodiment, the magazine 58 position and cell capacity are as follows: one left side front header magazine 62 with a 16 unit capacity; one left side front bow magazine 64 with a 16 unit capacity; one right side rear header magazine 66 with a 16 unit capacity; and one right side center rear roof magazine 68 with a 32 unit capacity.

Figure 8:
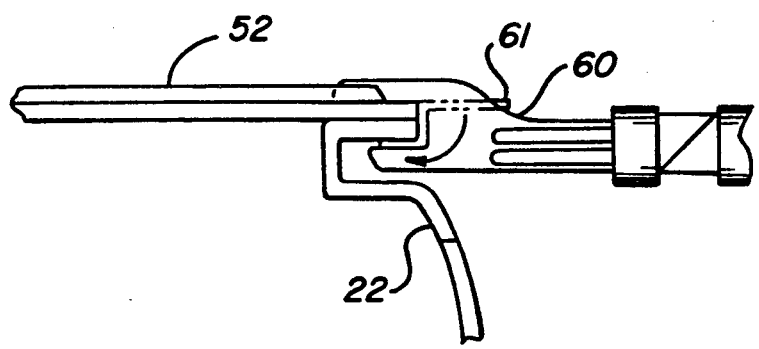
FIG. 8 is an elevational view of the robot end effector bending the tab portion of a body component.

In the preferred embodiment the robots will assemble the main body framework as follows. The left robot 36, using the end effector gripper 50 will grip and load a front roof header 52 and a front roof bow 54 on the aperture panels 22, referring to. The right robot 36 will grip and load a rear header 52 and center and rear roof bow 54 on the aperture panels 22. Next, the left and right robots 36 will rotate their wrist 39 to engage the end effector bender 60. The robots 36 will then move to the rear header 52 and bend the tab portion 61 thereof to engage the upper edge of the side aperture panels 22, as best shown in FIG. 8.

With all the tab portions 61 bent, the left and right robots 36 will rotate tool changer 38 to position the end effector fixture panel 40 to engage the frame member 42. Once the frame member 42 is engaged, the clamps 44 are opened and the lower pivot units 46 release the frame member 42. At this point the station cycle is complete and the completed unit is ready to be transferred out of the station 10 and the next underbody 12 will be simultaneously transferred into the station 10.

It should be noted that the operation of the above described work station is completely independent of the various vehicle body components used in the assembly of the vehicle body's main framework. Accordingly, if the body style of the vehicle is changed or additional vehicle body parts must be added, then all that is required of the system is to reprogram the robots to accommodate these changes.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

I claim:

1. In a work station for assembling together the main body framework components of a vehicle, including an underbody, roof headers, roof bows, and two side aperture panels, each component having plurality of tab members; an automated method of assembling and holding the vehicle body framework components together using a toy tab system, comprising the steps of:

transporting an underbody into a work station by a first carrier means for carrying said underbody into said work station for assembly and out of said work station when assembled;

holding said first carrier means in a proper X, Y, and Z coordinate location by a lower locating means fixed within the work station that accurately positions said first carrier means;

delivering a plurality of side aperture panels over said work station by a second carrier means for carrying said panels into said work station;

unloading said panels from said second carrier means onto an elevator means capable of extracting said panels from said second carrier means and moving vertically and horizontally;

lowering said panels into said workstation by said elevator means;

positioning alongside said workstation, a plurality of programmable robotic means capable of performing multiple functions;

unloading said panels from said elevator means by clamping onto said panels with said gripping means of said robotic means;

positioning said panels alongside said underbody using said robotic means;

clamping onto said gripping means of said robotic means by a lower clamping means;

disengaging said robotic means from said panels;

supplying a plurality of roof headers and roof bows into said work station by a delivery means;

positioning said roof headers and roof bows on said panels using said robotic means;

bending the plurality of tab members of said underbody, panels, roof headers and roof bows around an adjoining edge using said robotic means forming an intact vehicle body;

releasing said lower clamping means from said body; and transporting said body out of said workstation by said first carrier means.

2. The method of claim 1, wherein said first carrier means consists of a monotractor carrier system.

3. The method of claim 1, wherein said second carrier means consists of an aperture float and delivery monotractor system.

4. The method of claim 1, wherein said delivery means is a magazine.

5. The method of claim 1, wherein said robotic means is capable of performing multiple functions by changing a plurality of tools affixed to a boom member of said robotic means.

6. The method of claim 5, wherein said tools includes a panel fixture, a gripper and a bender.

* * * * *